(12) United States Patent
Jin et al.

(10) Patent No.: US 12,531,378 B2
(45) Date of Patent: Jan. 20, 2026

(54) OPTICAL COMMUNICATION SYSTEM WITH CONNECTOR SHIELD FOR ELIMINATION OF ELECTROMAGNETIC INTERFERENCE

(71) Applicant: Global Technology Inc., Ningbo (CN)

(72) Inventors: Hao Jin, Ningbo (CN); Fan Yang, Ningbo (CN); Qikun Huang, Ningbo (CN)

(73) Assignee: Global Technology Inc., Ningbo (CN)

( * ) Notice: Subject to any disclaimer, the term of this patent is extended or adjusted under 35 U.S.C. 154(b) by 444 days.

(21) Appl. No.: 17/976,475

(22) Filed: Oct. 28, 2022

(65) Prior Publication Data

US 2024/0079828 A1   Mar. 7, 2024

(30) Foreign Application Priority Data

Sep. 7, 2022   (CN) .......................... 202211087240.0

(51) Int. Cl.
*H01R 13/6585*   (2011.01)
*H01R 13/6471*   (2011.01)
*H01R 13/6588*   (2011.01)

(52) U.S. Cl.
CPC ..... *H01R 13/6585* (2013.01); *H01R 13/6471* (2013.01); *H01R 13/6588* (2013.01)

(58) Field of Classification Search
None
See application file for complete search history.

(56) References Cited

U.S. PATENT DOCUMENTS

| | | | |
|---|---|---|---|
| 8,597,036 B2 * | 12/2013 | Fogg ................. | H01R 13/6585 |
| | | | 439/660 |
| 10,218,108 B2 * | 2/2019 | Scholeno ........... | H01R 13/6587 |
| 10,367,308 B2 * | 7/2019 | Little .................. | H01R 4/2404 |
| 11,177,607 B2 * | 11/2021 | Takayanagi ......... | H01R 13/506 |
| 2021/0098940 A1 * | 4/2021 | Hibbs .................. | H01R 13/502 |

* cited by examiner

*Primary Examiner* — Felix O Figueroa
(74) *Attorney, Agent, or Firm* — Grossman Tucker Perreault & Pfleger, PLLC

(57) ABSTRACT

An optical communication system includes an optical communication board, a cage disposed on the optical communication board, an optical module disposed in the cage in pluggable manner, a connector disposed on the optical communication board, and a shield disposed on the connector. The connector includes a plurality of pins electrically connected with an electrical port of the optical module. At least two of the pins are spatially separated from each other by the shield.

6 Claims, 5 Drawing Sheets

OPTICAL COMMUNICATION SYSTEM WITH CONNECTOR SHIELD FOR ELIMINATION OF ELECTROMAGNETIC INTERFERENCE

CROSS-REFERENCE TO RELATED APPLICATIONS

This application claims priority under 35 U.S.C. § 119(a) on Patent Application No(s). 202211087240.0 filed in China on Sep. 7, 2022, the entire contents of which are hereby incorporated by reference.

BACKGROUND

1. Technical Field

The present disclosure relates to optical communication, more particularly to optical communication system including an optical module.

2. Related Art

Optical modules are generally installed in electronic communication facilities in modern high-speed communication networks. With the improvement of optical communication system and the increase in demand of wide bandwidth for various network services, issues of insufficient internal space and high energy consumption of the conventional optical communication systems need to be tackled. Any solution to provide the small size optical communication systems at minimum expense of internal accommodation space and energy consumption without sacrificing both the bandwidth and transmission speed has been one of the important topics in this technical field.

SUMMARY

According to one aspect of the present disclosure, an optical communication system includes an optical communication board, a cage disposed on the optical communication board, an optical module disposed in the cage in pluggable manner, a connector disposed on the optical communication board, and a shield disposed on the connector. The connector includes a plurality of pins electrically connected with an electrical port of the optical module. At least two of the pins are spatially separated from each other by the shield.

According to another aspect of the present disclosure, an optical communication system includes an optical communication board, a connector disposed on the optical communication board, and a shield disposed on the connector. The connector is located in or in proximity of an optical module mounting area of the optical communication board, and the connector comprises a plurality of pins. At least two of the pins are spatially separated from each other by the shield.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

With the development of communication technology, there is an increasing demand for signals featuring high frequency and large bandwidth. However, the intensity of high frequency signals is attenuated significantly during its propagation in the medium, and the high frequency signals are more sensitive to electromagnetic interference from the external environment or crosstalk with neighboring signals. Due to the trend of optical communication devices towards compactness for various applications, multiple signal transmission channels are provided in single optical module with high component density, isolation of the signals transmitted in different channels is one of the problems need to be properly addressed in this technical field.

Figure 1:
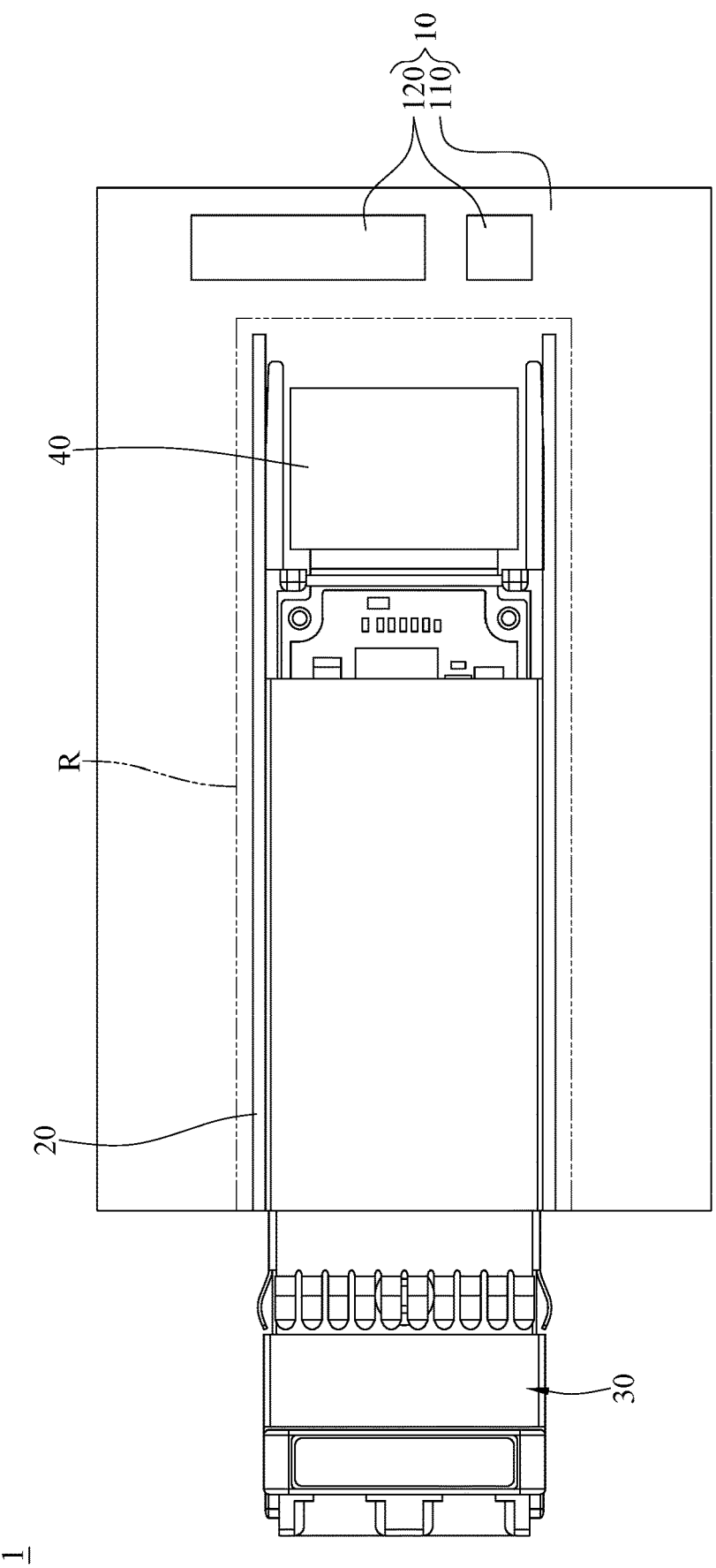
FIG. 1 is a top view of an optical communication system according of one embodiment of the present disclosure.
Figure 2:
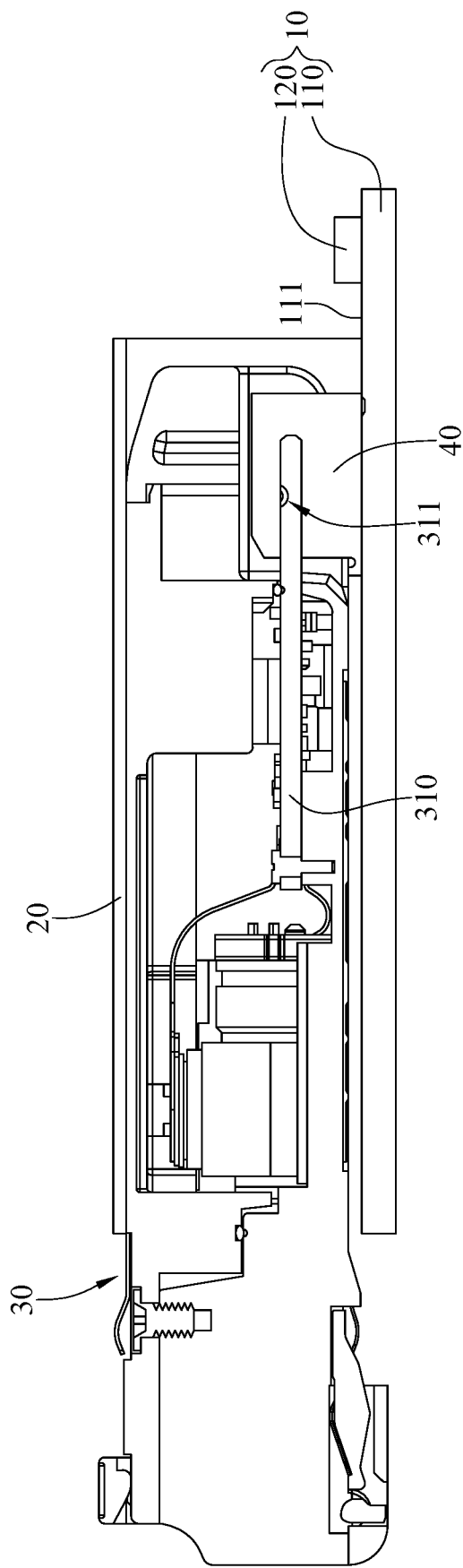
FIG. 2 is a cross-sectional view of the optical communication system in FIG. 1.

According to the present disclosure, an optical communication system may include a radio frequency circuit board (RFPCB) and an optical transceiver. Please refer to FIG. 1 and FIG. 2. FIG. 1 is a top view of an optical communication system according of one embodiment of the present disclosure, and FIG. 2 is a cross-sectional view of the optical communication system in FIG. 1. In this embodiment, an optical communication system 1 may include an optical communication board 10, a cage 20, an optical module 30 and a connector 40. The optical communication system 1 may be placed in a cabinet at a server room of a telecom operator. Also, the optical communication system 1 may be a RoF (Radio over Fiber) transmission system.

The optical communication board 10 may include a circuit board 110 and one or more optical elements 120 mounted on the circuit board 110. The optical elements 120 may include on-board optics such as an electronic chip corresponding to the optical module 30, a power supply, a switch for controlling the power supply to the optical module 30, and/or the like. Furthermore, the circuit board 110 of the optical communication board 10 includes an optical module mounting area R defined on the top surface 111 thereof beforehand.

The cage 20 is disposed in the optical module mounting area R of the optical communication board 10. Specifically, the cage 20 may be permanently fixed to the circuit board 110 of the optical communication board 10 by soldering, or the cage 20 is fastened with a slot (not shown in the drawings) formed on the circuit board 110. For the purpose of illustration, an upper portion of the cage 20 is omitted in FIG. 1.

The optical module 30 may be disposed in the cage in a pluggable manner.

Specifically, the optical module 30 may include a snap hook (not shown in the drawings), and the snap hook is fastened with a slot formed on the cage so as to mount the optical module 30 into the cage 20 The optical module 30 may further include release mechanism (not shown in the drawings) for releasing the connection between the snap hook and the corresponding slot so as to detach the optical module 30 from the cage 20.

Figure 3:
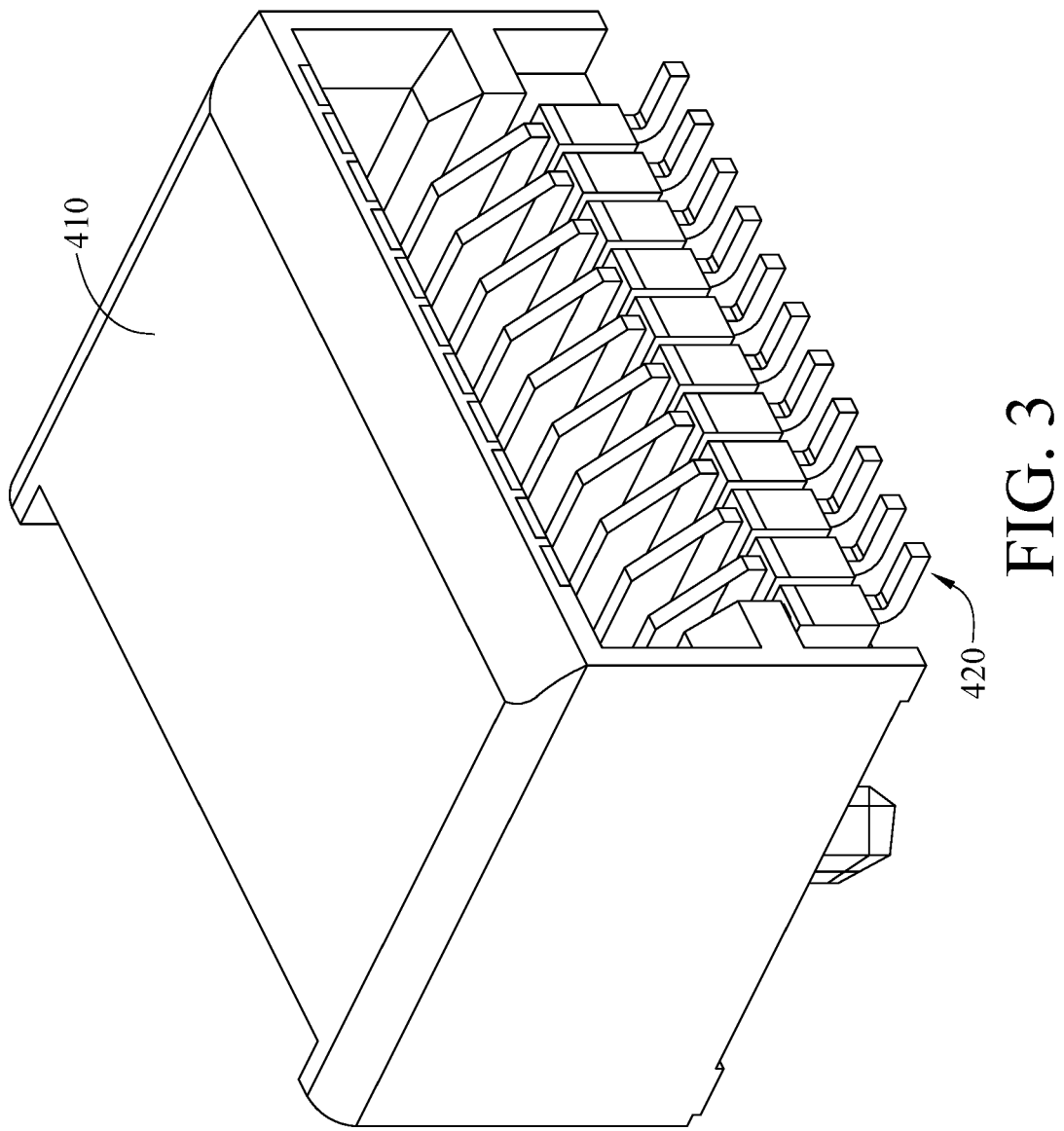
FIG. 3 is a perspective view of a connector of the optical communication system in FIG. 1.

The connector 40 may be disposed on the optical communication board 10. Please further refer to FIG. 3. FIG. 3 is a perspective view of a connector of the optical communication system in FIG. 1. The connector 40 may include a main body 410 and a plurality of pins 420. The pins 420 are disposed on the main body 410, and the main body 410 is fixed to the circuit board 110 of the optical communication board. More specifically, the main body 410 is located in the optical module mounting area R or a region in proximity of the optical module mounting area R. FIG. 1 exemplarily depicts the connector 40 located in the optical module mounting area R.

The pins 420 may be electrically connected with an electrical port 311 of the optical module 30. In detail, as shown in FIG. 2, the optical module 30 may include a circuit board assembly 310, and the circuit board assembly 310 includes the electrical port 311. The circuit board assembly 310 may be a PCBA (Printed Circuit Board Assembly) including a driver IC and one or more optical elements such as TOSA (Transmitter Optical Subassembly), ROSA (Receiver Optical Subassembly) or BOSA (Bi-directional Optical Subassembly). An end of the circuit board assembly 310 may be plugged into the main body 410 to electrically contact the pins 420.

FIG. 1 through FIG. 3 exemplarily depict a configuration in which the cage 20, the optical module 30 and the connector 40 are provided in a DSFP package outline, while it is noting that the present disclosure is not limited to said package outline. In some other embodiments, the cage, the optical module and the connector may be provided in a SFP package outline, a SF-DD package outline, a QSFP package outline or an OSFP package outline.

Figure 4:
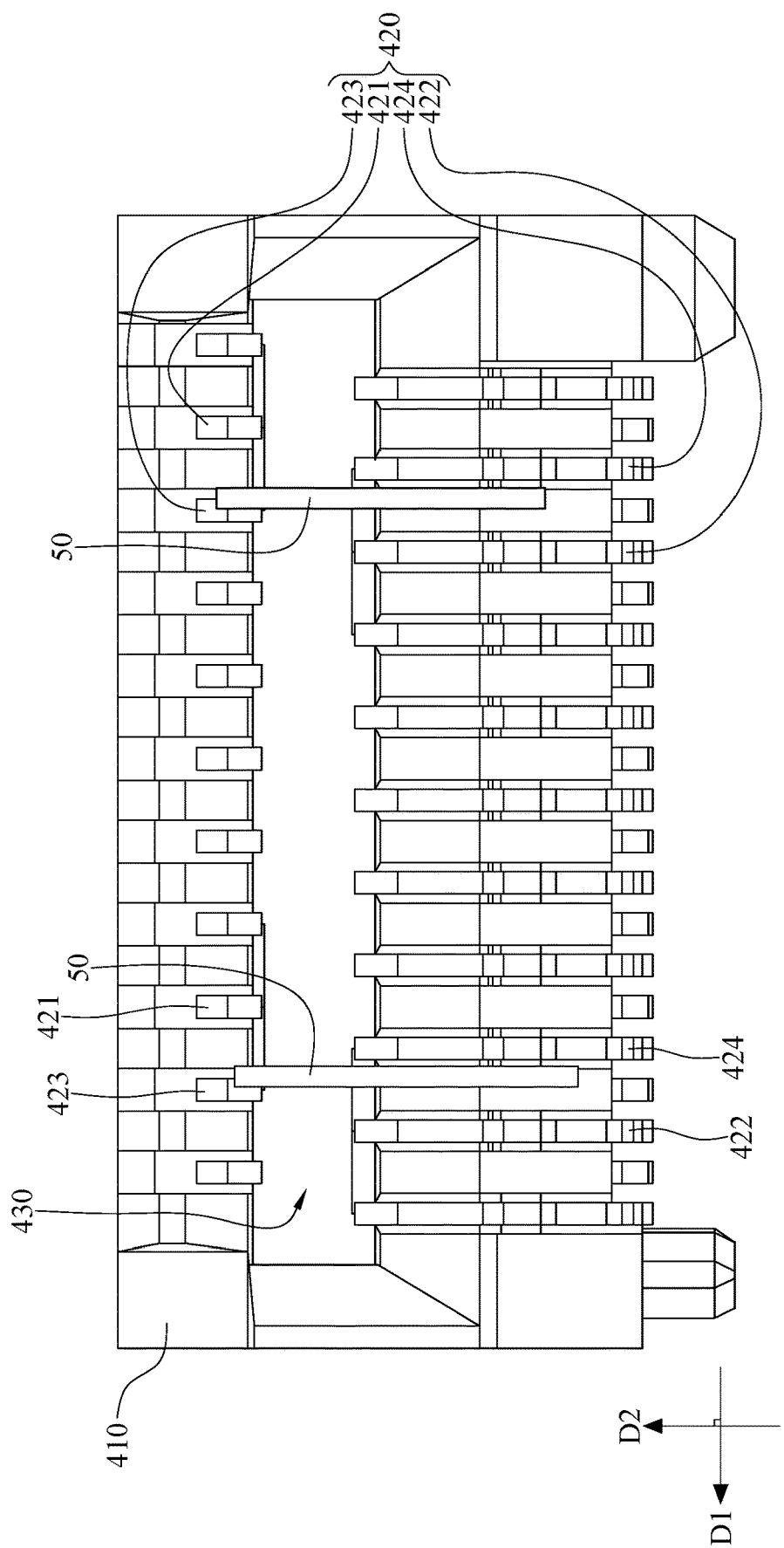
FIG. 4 is a front view of the connector in FIG. 3 where shields according to one embodiment are provided.

FIG. 4 is a front view of the connector in FIG. 3 where shields according to one embodiment are provided. The pins 420 of the connector 40 may include one or more upper connection pins 421, one or more lower connection pins 422, one or more upper grounded pins 423 and one or more lower grounded pins 424. In FIG. 3 and FIG. 4, an opening 430 of the connector 40 is configured to accommodate the circuit board assembly 310 of the optical module 30 plugged therein. The upper connection pins 421 and the upper grounded pins 423 are located at an upper region of the opening 430, and the lower connection pins 422 and the lower grounded pins 424 are located at a lower region of the opening 430. As to any one of the upper connection pins 421, any one of the lower connection pins 422, any one of the upper grounded pins 423 and any one of the lower grounded pins 424, there pins may be arranged in a staggered manner. As shown in FIG. 4, four of the pins are the upper connection pin 421, the lower grounded pin 424, the upper grounded pin 423, and the lower connection pin 422, along the horizontal direction D1 in a serial order. An offset in the horizontal direction D1 is between the upper connection pin 421 and the lower grounded pin 424, an offset in the horizontal direction D1 is between the lower grounded pin 424 and the upper grounded pin 423, and an offset in the horizontal direction D1 is between the upper grounded pin 423 and the lower connection pin 422. The upper connection pin 421 and the lower connection pin 422 may be configured to transmit RF signals, digital signals or analog signals to the optical communication board 10 and/or the optical module 30. The upper grounded pin 423 and the lower grounded pin 424 may be configured to connect to ground(s).

Referring to FIG. 4, the optical communication system 1 may further include one or more shields 50. The shields 50 may be disposed upright on the connector 40, and each of the shields 50 may spatially separate two of the pins 420 from each other. As shown in FIG. 4, the shield 50 may be fixed to the main body 410 of the connector 40, and a length direction or a thickness direction of the shield 50 may be parallel to the vertical direction D2. FIG. 0.4 exemplarily depicts that the length direction of the shield 50 is parallel to the vertical direction D2. The upright shield 50 may spatially separate the upper connection pin 421 from the lower connection pin 422. In other words, in the horizontal direction D1, the shield 50 is provided between a pair of upper connection pin 421 and lower connection pin 422. Similarly, in the horizontal direction D1, the shield 50 is also provided between a pair of the upper grounded pin 423 and the lower grounded pin 424. The shields 50 may be made of metal and grounded so as to eliminate the electromagnetic interference among the upper connection pins 421 and the lower connection pins 422.

Figure 5:
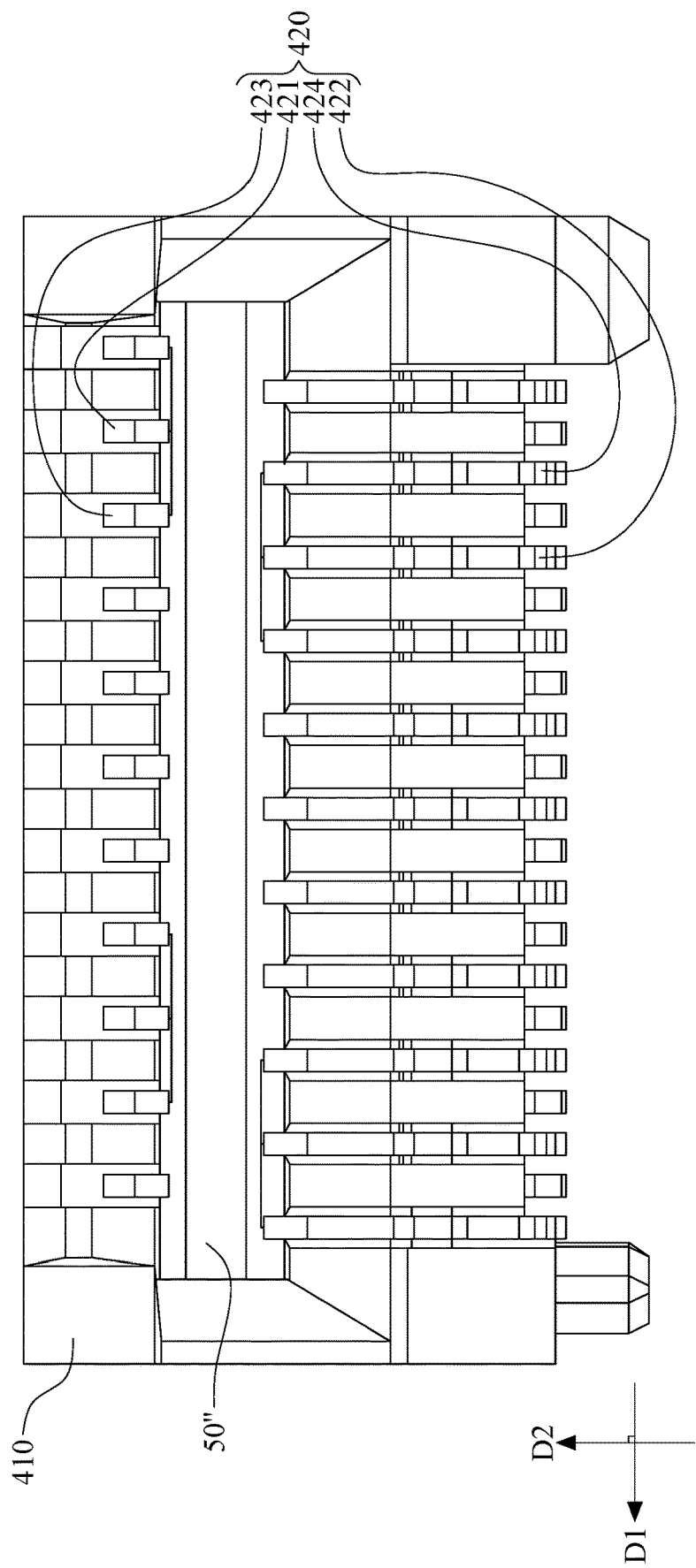
FIG. 5 is a front view of the connector in FIG. 3 where shields according to another embodiment are provided.

It is noting that the present disclosure is not limited to the configuration of the shield 50 n FIG. 4. FIG. 5 is a front view of the connector in FIG. 3 where shields according to another embodiment are provided. A configuration of the connector in FIG. 5 can be referred to the connector 40 including the main body 410 and the pins 420 in FIG. 4, and any detail description is omitted hereafter. The shield 50" is disposed flat, and the shield 50" may spatially separate the upper connection pin 421 from the lower connection pin 422. That is, in the vertical direction D2, the shield 50" is provided between a pair of upper connection pin 421 and lower connection pin 422. Similarly, in the vertical direction D2, the shield 50" is also provided between a pair of the upper grounded pin 423 and the lower grounded pin 424. The shield 50" may be made of metal and grounded so as to eliminate the electromagnetic interference among the upper connection pins 421 and the lower connection pins 422. FIG. 0.5 exemplarily depicts that the length direction of the shield 50 is parallel to the horizontal direction D1. In other words, the thickness direction of the shield 50 may be considered parallel to the vertical direction D2.

According to the present disclosure, the shield is disposed on the connector, and at least two of the plurality of pins are spatially separated from each other by the shield. Therefore, the shield between adjacent pins is helpful to eliminate the electromagnetic interference therebetween and also reduce crosstalk of the signals transmitted on the pins.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical communication system, comprising:
   an optical communication board;
   a cage disposed on the optical communication board;
   an optical module disposed in the cage in pluggable manner;
   a connector disposed on the optical communication board, wherein the connector comprises a plurality of pins electrically connected with an electrical port of the optical module, wherein the plurality of pins comprises a plurality of upper connection pins, a plurality of lower connection pins, a plurality of upper grounded pins and a plurality of lower grounded pins, wherein all of the plurality of upper connection pins and the plurality of upper grounded pins are arranged in a staggered manner relative to all of the plurality of lower connection pins and the plurality of lower grounded pins; and a shield disposed on the connector, wherein at least two of the plurality of pins are spatially separated from each other by the shield, wherein the shield is disposed upright, and at least one of the upper connection pins is spatially separated from at least one of the lower connection pins by the shield.

2. The optical communication system according to claim 1, wherein the connector further comprises a main body, the plurality of pins are disposed on the main body, and the main body is fixed to the optical communication board.

3. The optical communication system according to claim 2, wherein the optical module comprises a circuit board assembly comprising the electrical port, and part of the circuit board assembly is disposed on the main body in pluggable manner to be electrically connected with the plurality of pins.

4. The optical communication system according to claim 1, wherein the shield is made of metal and grounded.

5. An optical communication system, comprising:
an optical communication board;
a connector disposed on the optical communication board, wherein the connector is located in or in proximity of an optical module mounting area of the optical communication board, and the connector comprises a plurality of pins, wherein the plurality of pins comprises a plurality of upper connection pins, a plurality of lower connection pins, a plurality of upper grounded pins and a plurality of lower grounded pins, wherein all of the plurality of upper connection pins and the plurality of upper grounded pins are arranged in a staggered manner relative to all of the plurality of lower connection pins and the plurality of lower grounded pins; and a shield disposed on the connector, wherein at least two of the plurality of pins are spatially separated from each other by the shield, wherein the shield is disposed upright, at least one of the upper connection pins is spatially separated from at least one of the lower connection pins by the shield.

6. The optical communication system according to claim 5, wherein the shield is made of metal and grounded.

* * * * *